Feb. 2, 1932. R. H. HAMILTON Re. 18,343
SELF ADJUSTING TAPPET
Original Filed Jan. 9, 1930
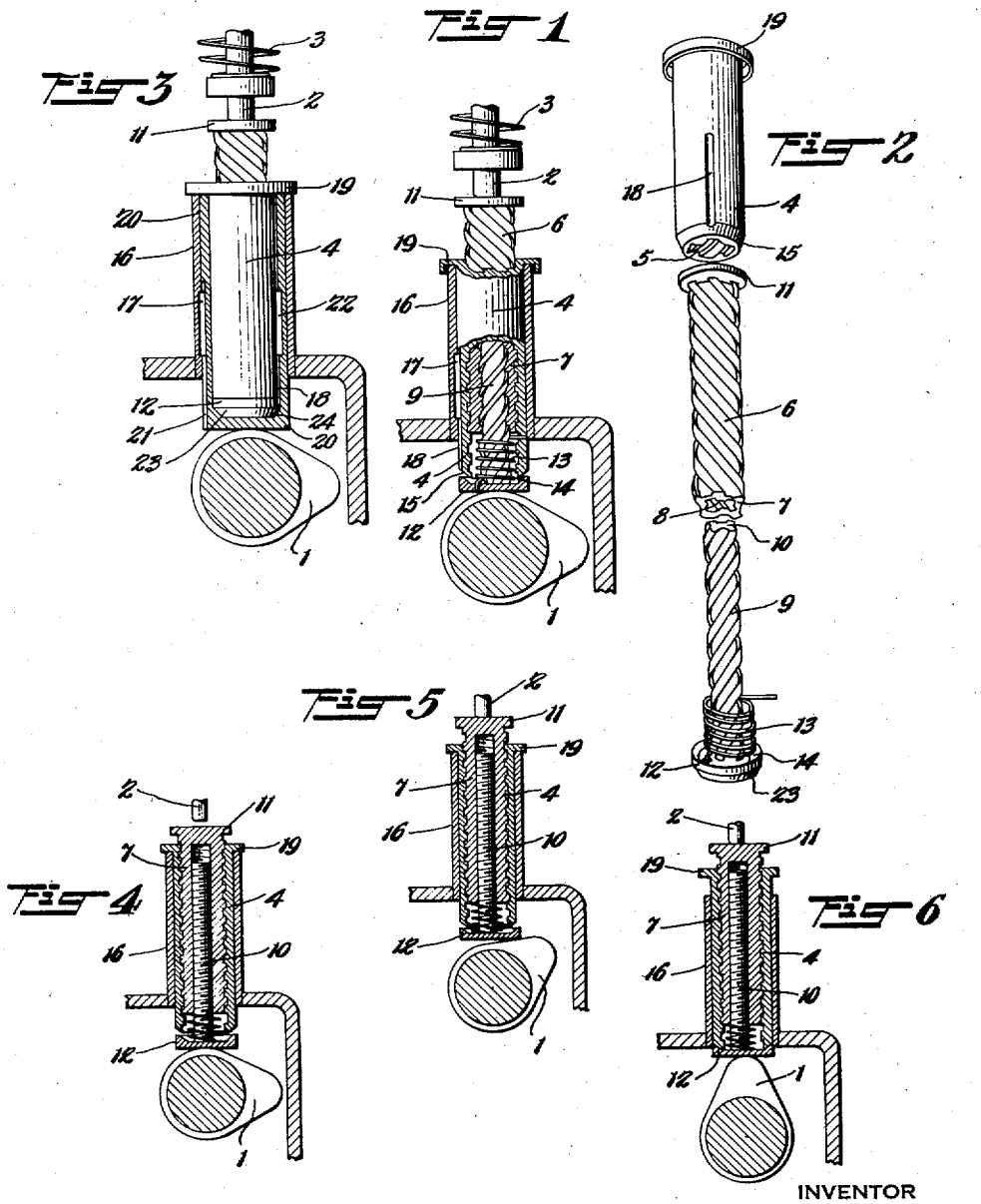
INVENTOR
Reginald Harold Hamilton
BY
Austin & Dix
ATTORNEYS Reissued Feb. 2, 1932

Re. 18,343

UNITED STATES PATENT OFFICE

REGINALD H. HAMILTON, OF CHRISTCHURCH, NEW ZEALAND

SELF ADJUSTING TAPPET

Original No. 1,786,237, dated December 23, 1930, Serial No. 419,511, filed January 9, 1930, and in New Zealand November 1, 1929. Application for reissue filed July 2, 1931. Serial No. 548,429.

This invention relates to tappets by means of which intermittent one-way thrust motion is communicated from a driving to a driven part, such for example as the tappets employed between the cam-shaft and the poppet-valves of an engine.

It is well recognized that, to operate efficiently, tappets of this kind must be of the exact length to fit between the said driving and driven parts, with an allowable clearance, as in cases where a tappet is too short a certain amount of movement is lost and excessive wear and noise result, while in the event of the tappet being too long the driven part is not permitted to fully return or reseat during the intervals between successive thrust impulses.

To maintain them in efficient condition therefore tappets require adjustment from time to time to compensate for wear that must inevitably occur in working surfaces.

It is the object of the present invention however to provide a tappet of novel and peculiar construction whereby the necessary adjustment of its length will occur automatically while the same is in use.

In addition to its value in saving manual adjustment and promptly compensating for any wear, or stretching, that may occur in its co-operating parts, the present invention possesses the further advantages that it automatically adjusts itself to compensate for slight variations that may occur in the spacing of the driving and driven parts due to temporary expansion and contraction of the metal as the result of variations of temperature.

In carrying this object into effect according to the present invention the tappet comprises essentially three members formed with corresponding internal and external screw threads whereby such members are screwed axially one within the other, the pitch of the said threads being of sufficient coarseness to permit of their said screwing action occurring in response to endwise impulses upon such members, one of the internal threads and its received external thread being right-handed while the other internal and external threads are left-handed.

In order that the nature of the invention and its construction may be clearly understood, it will now be fully described and explained with reference to the accompanying drawings, in which:—

Fig. 1 is an elevation of a tappet in accordance with the present invention together with its co-operating driving and driven parts, the construction being here shown partly broken away and in section to clearly reveal the internal parts and their arrangement.

Fig. 2 illustrates in perspective the composing parts of the tappet.

Fig. 3 is a somewhat similar view to that of Fig. 1 showing an addition to the construction, and, Figs. 4, 5 and 6 are sectional elevations of the tappet and its co-operating parts in more or less diagrammatic form illustrating its self-adjusting functions.

For the sake of illustrating its function, the tappet is here shown as communicating the thrust action of a cam 1 to the stem 2 of a valve operating against a valve-spring 3 in accordance with the well known practice in internal-combustion engines.

The tappet is however equally adapted for use in other forms of mechanism in which an intermittent one way thrust between a driving and a driven part is required.

In construction the tappet comprises a sleeve 4 having an internal thread 5 to receive a corresponding external thread 6 upon an intermediate member 7 which latter is formed also with an internally threaded axial bore 8 to receive a corresponding external thread 9 upon a third member 10.

One extremity 11 of the said intermediate member 7 at one end of the sleeve 4 constitutes one operative end of the tappet the other operative end of which is constituted by a head 12 upon the third member 10 at the other or opposite end of the sleeve 4.

The said threads are of sufficient coarseness to permit of the parts being screwed one within the other in response to impulses applied end-wise to such members and one pair of such threads is formed in the opposite direction to the other pair.

Thus, as here shown, the threads 5 and 6 may be left-handed while the threads 8 and 9 are right handed.

The third member 10 has a tendency to unscrew itself from the intermediate member 7 thereby placing its head 12 at an interval from the adjacent end of the sleeve 4, for a purpose hereinafter explained, such tendency being preferably attained by the provision of a spring.

In the preferred form of the construction this spring 13 is of the torsion type anchored at one end to the sleeve 4, while its other end is attached to some part of the third member 10, as by inserting it in a hole in the head 12 of such member, as here shown, such spring being arranged to act axially upon the member 10 in the unscrewing direction, as here shown.

The said torsion spring is preferably arranged also to act slightly in tension between its said connected parts.

Although other types of springs may be employed for this purpose a torsion-spring acting between the third-member 10 and the sleeve 4 as here shown possesses the very important advantage that, in addition to imparting the required tendency to the third member 10, it serves also to keep all the threads in the correct bearing relation for the operative action hereinafter explained, thereby avoiding any lost motion that might otherwise occur in consequences of looseness in the threads due to wear or other causes.

The head 12 of the third member 10 is adapted to come in contact with and frictionally engage its adjacent end of the sleeve 4, for which purpose such head is preferably formed with a tapered formation 14 adapted to receive a corresponding tapered formation 15 upon the said end of the sleeve.

The tappet thus constituted is arranged as here shown, its end 11 being operable upon the driven part 2 and the head 12 being acted upon and under constant control by the driving part 1.

If thought necessary or desirable also a piece of fibre or other suitable substance may be inserted in a recess in the end 11 to receive the contact with the driven part 2 and thus reduce noise.

The sleeve 4 is mounted to be capable of longitudinal reciprocation between such driving and driven parts, as for example by arranging it to slide within a tappet guide 16. The said sleeve may, when necessary, be restrained from axial turning by any suitable means, such for example as by the provision in the tappet-guide 16 of a feather 17 received in a feather-way 18 in the sleeve. However, when a torsion spring is used, this provision is unnecessary. Provision is made also for limiting the said movement of the sleeve 4 towards the driving part 1, as for instance by the provision upon the sleeve of an out-turned flange 19 adapted to come in contact with the end of the tappet-guide 16 adjacent to the driven part.

The arrangement shown in Fig. 3 is identical with that already described with the addition of a second sleeve 20 having a closed end and arranged to slidably receive the sleeve 4 and head 12.

In this case the said sleeve 20 is itself slidably received in the tappet-guide 16 and the necessary restraint of the sleeve 4 against axial turning is accomplished in any suitable manner, as by the provision in the sleeve 20 of a feather-way 21 to receive the aforementioned feather 17 in the tappet-guide and the provision in the sleeve 20 of a feather 22 to be received in the feather-way 18 of the sleeve 4.

In this case the driving part 1 acts upon the head 12 through the medium of the said closed end of the sleeve 20 and such end is preferably arranged to frictionally engage the head for which purpose the latter is preferably formed with a tapered formation 23 to be received by a corresponding tapered formation 24 in the said end.

The operation is briefly as follows:—

When the tappet comes to its position of rest in the intervals between successive operative impulses from the driving part 1 to the driven part 2, its sleeve 4 is arrested at a predetermined limit of proximity to the driving part 1 by its said stop means, constituted as by the contact of the flange 19 with the end of the tappet guide 16.

This arresting of the sleeve is arranged to take place slightly before the return of the driving part 1 is fully completed and consequently during the remainder of such return movement the third member 10, owing to its aforementioned tendency, unscrews itself slightly from the intermediate member 7, thus placing its head 12 at an interval from the end of the sleeve, as shown in Figs. 1, 3, and 4, and in which condition the said threaded members are capable of movement in relation to one another.

When the parts are in this condition the third member 10 possesses somewhat greater resistance to movement into the intermediate member 7 than does the latter to movement through the sleeve 4.

When therefore the driving part 1, in commencing its operative movement, applies a thrust to the head 12 the third member 10 and intermediate member 7 attempt to move through the sleeve towards the driven member.

If the tappet is of the correct length as in Figs. 1 and 3, this movement will be frustrated by reason of the fact that the end 11 of the intermediate member is already in contact with the driven part 2. Should the tappet be too short however, as in Fig. 4, this movement of the members 10 and 7 will actually take place until the said end 11 contacts with the driven part, as shown in Fig. 5, thereby producing the required lengthening of the tappet.

In the event of the deficiency in the length of the tappet being too great to allow of its being fully made up in a single movement as above explained, the adjustment will occur progressively as the result of two or more successive movements.

Where, however, a torsion spring is employed to act between the sleeve 4 and the third member 10 as described, such spring will exert a constant control upon the intermediate member 7 tending to keep the end 11 of the latter in contact with the driven part 1.

In such cases therefore, in the event of the tappet being too short the action of the said spring will move the intermediate member 7 through the sleeve 4 sufficiently to make up the deficiency immediately the head 12 disengages the end of the sleeve. In this case therefore the adjustment will occur immediately the tappet assumes its position of rest and not as the result of subsequent movement of the driving part 1, as previously explained.

In either case however the intermediate member 7 being thus arrested by contact with the driven part 2 the subsequent movement of the driving part 1 causes the third member 10 to move into the intermediate member 7 until the head 12 comes in contact and frictionally engages the end of the sleeve 4, thus locking both pairs of threads and so rendering the tappet rigid to slide through the guide and so convey the operative movement from the driving part 1 to the driven part 2, as shown in Fig. 6.

In the event of the tappet being too long the driven part 2 will not be returned or seated when the sleeve 4 is arrested by contact of its flange 19 with the end of the tappet-guide. Upon the sleeve being arrested and the head 12 disengaging the sleeve 4 therefore the pressure of the driven part 2 upon the end 11 forces the intermediate member into the sleeve until such driven member reaches its fully seated position.

In the case of the construction shown in Fig. 3, the functions of the tappet in lengthening or shortening to accommodate itself to the driving and driven parts will be identical with that already described. In this case however the friction of the sleeve 20 with the head tends to reduce the freedom of the latter to axial turning and so serves to stabilize the action of the third member 10.

In addition to this the interior of the sleeve 20 serves as an oil-container, thus ensuring a thorough lubrication of the internal parts of the tappet independently of other sources.

Again in cases where the tappet is to be provided with an anti-friction roller or other special formation to be received by the driving part 1, the said sleeve 20 affords a convenient means whereon such roller or formation may be mounted and serves also as a guide by means of which the third member 10 is relieved of lateral strain.

The slight interval that must necessarily occur between the head 12 and the end of the sleeve 4 when the tappet occupies its position of rest need be no greater and may indeed be even less than the customary clearance allowed between a tappet of the ordinary kind and the driven part, say one or more thousandths of an inch, and consequently the self adjustment provided by a tappet in accordance with this invention will be as correct and accurate as would be possible with manually adjusted tappets. Again the ability to automatic re-adjustment after each operative movement enables a tappet in accordance with the present invention to compensate not only for the gradual effect of wear, but also for temporary changes in the spacing of the driving and driven parts due to expansion and contraction of metals in consequence of temperature variations, or other causes.

I claim:

1. A tappet comprising a sleeve reciprocable longitudinally between a driving and a driven part, an internal thread in said sleeve, an intermediate member having one end actable upon said driven part, said member being formed with an external thread received in said thread in the sleeve, an axial bore in said intermediate member having an internal thread formed in the opposite direction to that of aforesaid threads, a third member having an external thread received in said threaded bore, all of said threads being of sufficient coarseness to permit of said members being screwed one within the other in response to endwise impulses, a head upon said third member actable upon by said driving part and adapted under pressure of the latter to contact with the adjacent end of said sleeve, thereby to retain said threaded parts rigid, stop-means limiting aforesaid movement of said sleeve towards the driving part, and means tending to unscrew said third member from said intermediate member thereby to carry said head clear of the sleeve to permit of said threaded members readjusting themselves to the requirements of said driving and driven parts when said sleeve is in contact with said limiting stop.

2. A tappet comprising a sleeve reciprocable longitudinally between a driving and a driven part but restrained from axial turning, an internal thread in said sleeve, an intermediate member having one end actable upon said driven part, said member being formed with an external thread received in said thread in the sleeve, an axial bore in said intermediate member having an internal thread formed in the opposite direction to that of aforesaid threads, a third member having an external thread received in said threaded bore, all of said threads being of sufficient coarseness to permit of said members being screwed one within the other in response to endwise impulses, a head upon said third member actable upon by said driving part and adapted under pressure of the latter to contact with the adjacent end of the sleeve thereby to retain said threaded parts rigid, stop-means limiting aforesaid movement of the sleeve towards said driving part, and a spring tending to unscrew said third member from said intermediate member thereby to carry said head clear of the sleeve to permit of said threaded members re-adjusting themselves to the requirements of said driving and driven parts when said sleeve is in contact with said limiting stop.

3. A tappet comprising a sleeve reciprocable longitudinally between a driving and a driven part but restrained from axial turning, an internal thread in said sleeve, an intermediate member having one end actable upon said driven part, said member being formed with an external thread received in said thread in the sleeve, an axial bore in said intermediate member having an internal thread formed in the opposite direction to that of aforesaid threads, a third member having an external thread received in said threaded bore, all of said threads being of sufficient coarseness to permit of said members being screwed one within the other in response to end-wise impulses, a head upon said third member actable upon by said driving part and adapted under pressure of the latter to contact with the adjacent end of said sleeve, thereby to retain said threaded parts rigid, stop-means limiting aforesaid movement of said sleeve towards the driving part, and a spring acting in torsion between said sleeve and said third member and tending to unscrew the latter from said intermediate member thereby to carry said head clear of said sleeve to permit of said threaded members re-adjusting themselves to the requirements of said driving and driven parts when said sleeve is in contact with said limiting stop.

4. A tappet as defined in claim 1 wherein said sleeve is slidable within a tappet guide and wherein said limiting stop is constituted by an out-turned flange upon said sleeve adapted to come in contact with the end of said tappet-guide when said sleeve reaches a predetermined position of proximity to said driving part.

5. A tappet as defined in claim 1 wherein said head of the third member is provided with a tapered formation to receive a corresponding tapered formation upon the end of the sleeve.

6. A tappet as defined in claim 1 wherein said sleeve is slidably but non-rotatably received within a second sleeve having a closed end to enclose the head of the third member and provide a medium whereby the latter is acted upon by said driving part.

7. A tappet, comprising an internally threaded outer sleeve reciprocable longitudinally between a driving member and a driven member, an externally threaded member disposed within and spaced from said sleeve, the thread of said member being formed in the opposite direction from that of the sleeve, said inner member having at one end a head disposed in position to be acted on by said driving member, an intermediate sleeve disposed between said outer sleeve and the inner member and having exterior and interior threads engaging the threads of said sleeve and inner member respectively, said intermediate sleeve having means at one end thereof for actuating the driven member, and means tending to unscrew said inner member from said intermediate sleeve.

8. In a valve operating mechanism, a driving element, a driven element, an adjustable device therebetween comprising driving and driven portions and means operative by a small but positive movement of said driving portion from the limit of travel of said driving portion toward said driving element to cause said adjustable device to become rigid and means for causing said adjustable device to become freely flexible to permit lengthening or shortening of the same as soon as the valve seats.

9. In a valve operating mechanism, a driving element, a valve, a driven element operating said valve, a stationary member, a tappet having a first portion adapted to engage said driving element, a second portion adapted to engage said driven element to transmit motion to said valve, a control portion adapted to engage said stationary member when the valve is seated and means controlled by engagement of said control portion and stationary member for lengthening or shortening the tappet to fit between said driving element and driven element, and means for causing said tappet to become, in effect, a rigid unit when said control portion disengages said stationary element.

10. In an adjustable device, a first contact member having opposite threads, a control member engageable with one of said threads, a second contact member engageable with the other of said threads, said contact members adapted to engage adjacent operating elements forming part of a chain subjected to conditions causing the distance between said operating elements to vary from time to time, means causing said contact members to substantially continuously engage their operating elements irrespective of variations in the distance therebetween, and means cooperating with said control member for causing said adjustable device to become, in effect, a rigid unit at times and to be free to adjust itself between said adjacent operating elements at other times.

11. In a tappet, a driving portion adapted to engage a driving element, a driven portion adapted to engage a driven element, a control portion adapted to engage a stationary member near the limit of movement of the tappet toward the driving element, said driven portion having opposite screw threads engageable, respectively, with mating screw threads on said control portion and driving portion, a spring acting between said control and driving portions urging said control and driving portions apart, and clutch elements on said control and driving portions disengageable when said control portion engages said stationary member allowing said spring to expand said control and driving portions, said clutch elements engaging when said driving portion is moved by said driving element a minute distance from the limit of travel of said driving portion toward said driving element to rigidly lock the parts of the tappet together.

12. A tappet comprising a sleeve reciprocable longitudinally between a driving and a driven part, an internal thread in said sleeve, an intermediate member having one end engageable with said driven part and having an external thread received in said sleeve thread, said intermediate member having a second thread of opposite direction to said first thread, a third member engageable by said driving part and having a thread engaging said second thread, all of said threads being of sufficient coarseness to permit of said members being screwed one on the other in response to endwise impulses, said sleeve and third member having clutch parts which engage under force applied to said third member, thereby to retain said threaded parts rigid, a limiting stop for limiting movement of said sleeve toward said driving part to disengage said clutch parts, and a helical spring applying a turning movement between said sleeve and third member, tending to unscrew said third member from said intermediate member thereby to disengage said clutch parts to permit of said threaded members re-adjusting themselves to the requirements of said driving and driven parts when said sleeve is in contact with said limiting stop.

In testimony whereof I have hereunto affixed my signature.

REGINALD H. HAMILTON.